United States Patent
Bao et al.

(10) Patent No.: US 12,375,547 B2
(45) Date of Patent: *Jul. 29, 2025

(54) MULTIMEDIA DATA TRANSMISSION APPARATUS AND METHOD

(71) Applicant: LONTIUM SEMICONDUCTOR CORPORATION, Anhui (CN)

(72) Inventors: Shenghui Bao, Anhui (CN); Hui Bian, Anhui (CN); Dexing Luo, Anhui (CN); Fengyu Gao, Anhui (CN); Dawei Wu, Anhui (CN); Diansheng Ren, Anhui (CN); Jin Su, Anhui (CN)

(73) Assignee: LONTIUM SEMICONDUCTOR CORPORATION, Anhui (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,209

(22) Filed: Nov. 9, 2023

(65) Prior Publication Data

US 2024/0259457 A1 Aug. 1, 2024

(30) Foreign Application Priority Data

Jan. 28, 2023 (CN) .......................... 202310104253.2

(51) Int. Cl.
*H04L 65/75* (2022.01)

(52) U.S. Cl.
CPC .......... *H04L 65/762* (2022.05); *H04L 65/765* (2022.05)

(58) Field of Classification Search
None
See application file for complete search history.

(56) References Cited

U.S. PATENT DOCUMENTS

| | | | |
|---|---|---|---|
| 5,881,203 A | 3/1999 | Fujinami et al. | |
| 9,161,093 B2 * | 10/2015 | Huang | H04N 21/6181 |

(Continued)

FOREIGN PATENT DOCUMENTS

| | | |
|---|---|---|
| CN | 1901675 A | 1/2007 |
| CN | 101841689 A | 9/2010 |

(Continued)

OTHER PUBLICATIONS

CNIPA 1st Office Action for corresponding CN Application No. 202310104253.2; issued Apr. 17, 2023.

*Primary Examiner* — Ranodhi Serrao
(74) *Attorney, Agent, or Firm* — CANTOR COLBURN LLP

(57) ABSTRACT

A multimedia data transmission apparatus and method are provided. In the method, a data receiver receives at least one channel of multimedia data and transmits the received multimedia data to a selector and a data synthesis module. The selector selects target multimedia data from the received multimedia data and transmits the target multimedia data to a data processing module. The data processing module performs a format conversion on the target multimedia data to obtain converted data and transmits the converted data to a data transmitting module. The data synthesis module synthesizes the received multimedia data to obtain synthesized data and transmits the synthesized data to the data transmitting module. The data transmitting module transmits the converted data to a first processing device and transmits the synthesized data to a second processing device.

8 Claims, 3 Drawing Sheets

(56) References Cited

U.S. PATENT DOCUMENTS

| | | | |
|---|---|---|---|
| 2002/0143975 A1* | 10/2002 | Kimura | H04N 21/234336 709/237 |
| 2006/0077310 A1* | 4/2006 | Wang | H04N 21/4621 348/554 |
| 2007/0006269 A1* | 1/2007 | Huang | H04N 21/6181 725/100 |
| 2014/0204962 A1* | 7/2014 | Park | H04N 21/2389 370/509 |
| 2022/0224857 A1 | 7/2022 | Bao et al. | |
| 2024/0256481 A1* | 8/2024 | Bao | G06F 13/4282 |

FOREIGN PATENT DOCUMENTS

| | | |
|---|---|---|
| CN | 112685355 A | 4/2021 |
| WO | 2006020119 A2 | 2/2006 |

* cited by examiner

MULTIMEDIA DATA TRANSMISSION APPARATUS AND METHOD

CROSS REFERENCES TO RELATED APPLICATIONS

The present invention claims priority under 35 U.S.C. § 119 to Chinese Application, 202310104253.2, filed on Jan. 28, 2023, the entire contents of which being incorporated herein by reference.

FIELD

The present disclosure relates to the technical field of data transmission, and in particular to a multimedia data transmission apparatus and method.

BACKGROUND

With the development of multimedia technology, multimedia data is used in various scenarios of daily life. Some scenarios require the application of multi-channel multimedia data. Therefore, multimedia data is received from multiple data sources. Currently, during a multimedia data transmission process, each of the data sources transmits multimedia data to a terminal device corresponding to the data source through a transmission line. As the number of the data sources increases and distances between the data sources and terminal devices increases, a large number of transmission lines are used to transmit the multimedia data, resulting in increased transmission cost of the multimedia data.

SUMMARY

In view of this, a multimedia data transmission apparatus and method are provided according to embodiments of the present disclosure, to effectively reduce the use of lines during a transmission process of multi-channel multimedia data and effectively reduce the cost of data transmission.

In order to achieve the above objectives, the following technical solutions are provided according to the present disclosure.

A multimedia data transmission apparatus is provided, including: a selector, a data processing module, a data synthesis module, a data receiver, and a data transmitting module.

The data receiver is configured to receive at least one channel of multimedia data and transmit the received multimedia data to the selector and the data synthesis module.

The selector is configured to select target multimedia data from the received multimedia data and transmit the target multimedia data to the data processing module.

The data processing module is configured to perform a format conversion on the target multimedia data to obtain converted data and transmit the converted data to the data transmitting module.

The data synthesis module is configured to synthesize the received multimedia data to obtain synthesized data and transmit the synthesized data to the data transmitting module.

The data transmitting module is configured to transmit the converted data to a preset first processing device and transmit the synthesized data to a preset second processing device.

In an embodiment, in the above apparatus, the selector selecting the target multimedia data from the received multimedia data includes obtaining, by the selector, a data identifier from preset selection configuration information, and determining multimedia data corresponding to the data identifier as the target multimedia data.

In an embodiment, in the above apparatus, the data processing module performing the format conversion on the target multimedia data to obtain the converted data includes determining, by the data processing module, a target data format based on preset format configuration information; and performing the format conversion on the target multimedia data based on the target data format, to obtain the converted data in the target data format.

In an embodiment, in the above apparatus, the data synthesis module synthesizing the received multimedia data to obtain the synthesized data includes: determining, by the data synthesis module, data selection information and transmission format information based on preset synthesis configuration information; determining to-be-synthesized data from the received multimedia data based on the data selection information; and synthesizing the to-be-synthesized data based on the transmission format information to obtain the synthesized data.

In an embodiment, in the above apparatus, the data transmitting module includes multiple transmitters, where each of the transmitters is configured to transmit data, and the multiple transmitters transmit data in different data formats.

A multimedia data transmission method is provided. The method includes: receiving, by a preset data receiver, at least one channel of multimedia data, and transmitting the received multimedia data to a preset selector and a preset data synthesis module; selecting, by the selector, target multimedia data from the received multimedia data and transmitting the target multimedia data to a preset data processing module; performing, by the data processing module, a format conversion on the target multimedia data to obtain converted data, and transmitting the converted data to a preset data transmitting module; synthesizing, by the data synthesis module, the received multimedia data to obtain synthesized data, and transmitting the synthesized data to the data transmitting module; and transmitting, by the data transmitting module, the converted data to a preset first processing device and transmitting the synthesized data to a preset second processing device.

In an embodiment, in the above method, the selecting, by the selector, the target multimedia data from the received multimedia data includes determining by the selector, a data identifier from preset selection configuration information, and determining multimedia data corresponding to the data identifier as the target multimedia data.

In an embodiment, in the above method, the performing, by the data processing module, the format conversion on the target multimedia data to obtain the converted data includes determining, by the data processing module, a target data format based on preset format configuration information; and performing the format conversion on the target multimedia data based on the target data format, to obtain the converted data in the target data format.

In an embodiment, in the above method, the synthesizing, by the data synthesis module, the received multimedia data to obtain the synthesized data includes: determining, by the data synthesis module, data selection information and transmission format information based on preset synthesis configuration information; determining to-be-synthesized data from the received multimedia data based on the data selection information; and synthesizing the to-be-synthesized data based on the transmission format information to obtain the synthesized data.

In an embodiment, in the above method, the transmitting, by the data transmitting module, the converted data to a preset first processing device includes: determining, by the data transmitting module, a transmitter corresponding to the target data format based on the target data format of the converted data and transmitting the converted data to the first processing device by using the transmitter.

Compared with the conventional technology, the present disclosure has the following advantages.

A multimedia data transmission apparatus and method are provided according to the present disclosure. The method includes as follows. The data receiver receives at least one channel of multimedia data and transmits the received multimedia data to the selector and the data synthesis module. The selector selects target multimedia data from the received multimedia data and transmits the target multimedia data to the data processing module. The data processing module performs the format conversion on the target multimedia data to obtain converted data and transmits the converted data to the data transmitting module. The data synthesis module synthesizes the received multimedia data to obtain synthesized data and transmits the synthesized data to the data transmitting module. The data transmitting module transmits the converted data to the preset first processing device and transmits the synthesized data to the preset second processing device. According to the present disclosure, multi-channel multimedia data may be synthesized by the data synthesis module to obtain the synthesized data, and data to be transmitted to the first processing device is selected from the multi-channel multimedia data by using the selector. Thus, in the case of the transmission of multi-channel data, the transmission of specific data to other devices may not be affected. According to the present disclosure, multi-channel data may be transmitted, and specific data may be extracted to be transmitted to other devices without increasing the cost of lines. In this way, multiple data transmission manners can be provided, while the cost of data transmission is reduced.

BRIEF DESCRIPTION OF THE DRAWINGS

In order to illustrate technical solutions in embodiments of the present disclosure or the conventional technology more clearly, drawings to be used in the embodiments or the conventional technology are introduced simply hereinafter. It is apparent that the drawings described below show only some embodiments of the present disclosure. For those skilled in the art, other drawings may be obtained based on the provided drawings without any creative effort.

DETAILED DESCRIPTION

Figure 1:
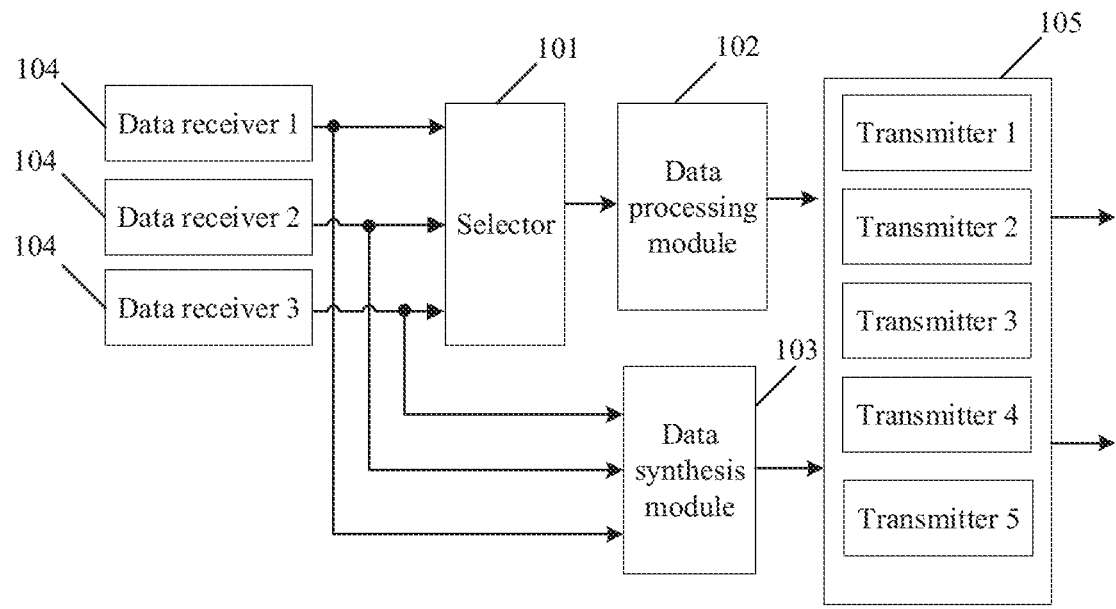
FIG. 1 is a schematic structural diagram of a multimedia data transmission apparatus according to an embodiment of the present disclosure.

The technical solutions in the embodiments of the present disclosure are described clearly and completely in conjunction with the drawings in the embodiments of the present disclosure hereinafter. It is apparent that the embodiments described herein are only some embodiments of the present disclosure, rather than all the embodiments. Based on the embodiments of the present disclosure, all other embodiments obtained by those skilled in the art without any creative effort should fall within the protection scope of the present disclosure.

In the present disclosure, terms "include", "comprise" or any other variants are intended to be non-exclusive. Therefore, a process, method, article, or device including a series of elements includes not only the elements but also other elements that are not enumerated, or also include elements inherent for the process, method, article, or device. Unless expressively limited otherwise, the statement "comprising/including a(n) . . . " does not exclude existence of another identical element in such process, method, article, or device including the elements.

As multimedia data is widely used in daily life, there may be multiple video sources in some application scenarios, and the multiple video sources are located at different locations. A transmission line is required between each of the video sources and a terminal device in order to acquire video signals and transmit the video signals to the terminal device. Such solution is feasible for few video sources, while the solution results in increased cost of the lines for many video sources.

In view of the above problem, according to the present disclosure, a data receiver for multi-channel multimedia data may be used to acquire the multimedia data; and a data synthesis module may be used to synthesize the received multimedia data. Therefore, in the process of transmitting the multi-channel multimedia data to the device terminal, the use of the lines can be effectively reduced, reducing the cost of data transmission.

Term Explanation:
- LVDS: Low-Voltage-Differential-Signaling, which is a unified video transmission protocol;
- TTL: Transistor-Transistor Logic, which is a unified video transmission protocol;
- MIPI: Mobile Industry Processor Interface, which is a unified video transmission protocol;
- EDP: Embedded Display Port, which has a unified video transmission protocol;
- ADP: Automotive Display Port, which is a customized data integration transmission protocol, belonging to high-speed signals and using a physical layer and a protocol layer;
- Receiver: a device for receiving a specific signal;
- Transmitter: a device for transmitting a specific signal; and
- Virtual channel: a multi-channel video transmission mode in a MIPI protocol.

The present disclosure is applicable to environments or configurations of various general or specialized computing devices, such as a personal computer, a server computer, a handheld device or a portable device, a tablet device, a multi-processor device, or a distributed computing environment including any of the above apparatuses or devices.

A multimedia data transmission apparatus is provided according to the present disclosure. The apparatus may be configured to acquire multi-channel multimedia data, synthesize the multi-channel multimedia data, and transmit the synthesized multimedia data to a corresponding device.

Reference is made to FIG. 1, which is a schematic structural diagram of a multimedia data transmission apparatus according to an embodiment of the present disclosure. Details of the multimedia data transmission apparatus are as follows.

A multimedia data transmission apparatus includes a selector 101, a data processing module 102, a data synthesis module 103, a data receiver 104, and a data transmitting module 105.

Figure 3:
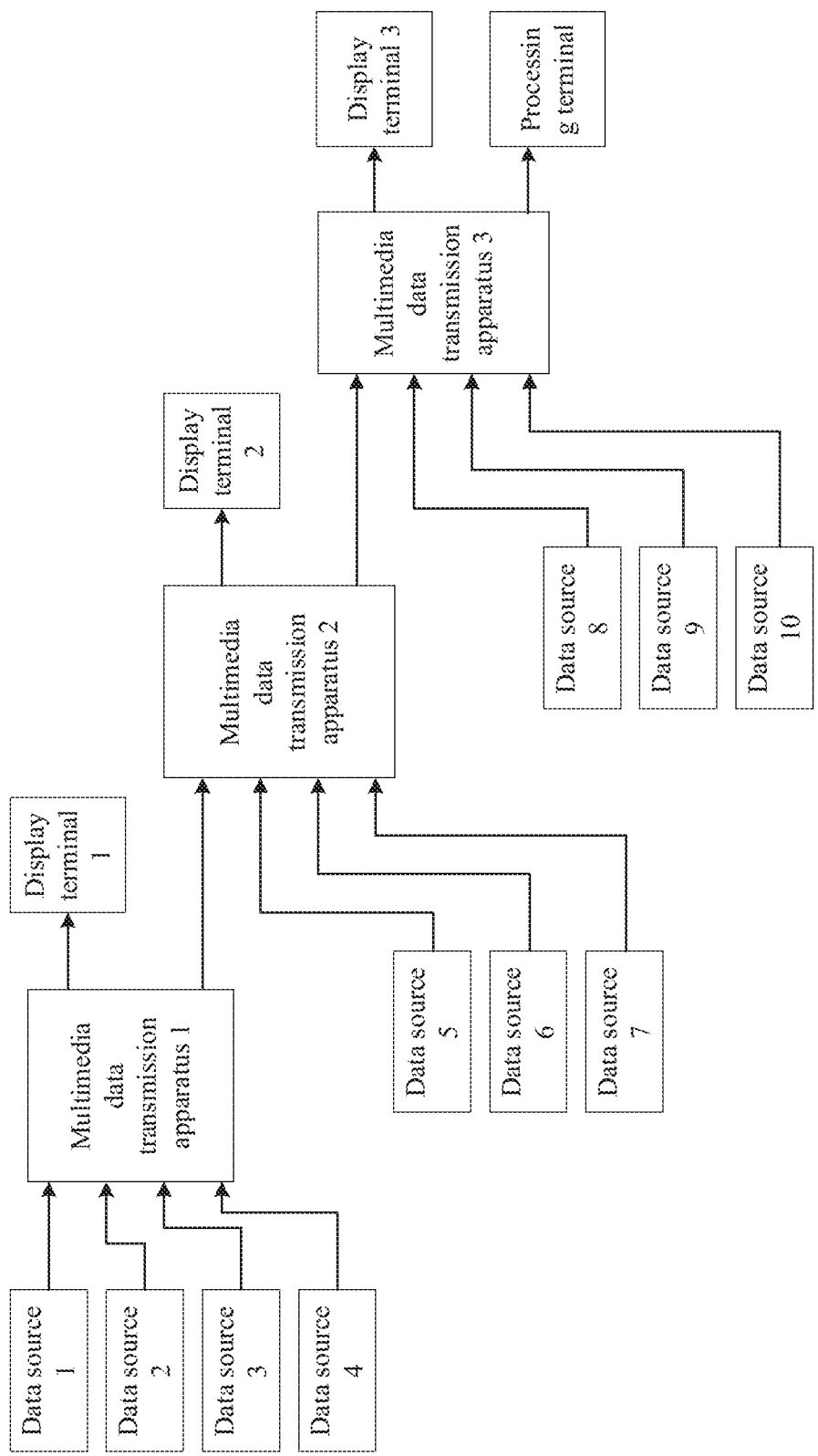
FIG. 3 is a schematic diagram of a scenario of a multimedia data transmission apparatus according to an embodiment of the present disclosure.

The data receiver 104 is configured to receive at least one channel of multimedia data and transmit the received multimedia data to the selector 101 and the data synthesis module 103. The multimedia data transmission apparatus according to the present disclosure includes at least one data receiver. As shown in FIG. 3, the number of the data receiver is three, namely, a data receiver 1, a data receiver 2, and a data receiver 3. In an embodiment, the data receivers in the present disclosure have the same function and the same structure. Furthermore, each of the data receivers may receive one or more channels of multimedia data. In an embodiment, the data receiver may be an ADP receiver, which may acquire multiple channels of multimedia data based on an ADP interface protocol.

The data receiver may acquire the multimedia data through multiple data channels. At least one channel of multimedia data is acquired through one of the data channels.

The multimedia data includes, but is not limited to, audio data, video data, or audio and video data.

The data receiver may receive multimedia data from a data source. One data receiver may receive data from multiple data sources. On receipt of multimedia data, each data receiver transmits the received multimedia data to the selector and the data synthesis module.

The selector 101 is configured to select target multimedia data from the received multimedia data and transmit the target multimedia data to the data processing module 102.

The selector is connected to the data receiver and the data processing module. The selector is configured to select the target multimedia data from the received multimedia data. Specifically, the selector obtains a data identifier from preset selection configuration information and determines multimedia data corresponding to the data identifier as the target multimedia data.

It should be noted that the selection configuration information is pre-configured in the selector, and the selection configuration information includes the data identifier. The data identifier is an identifier of data to be selected. The selection configuration information may be configured before the transmitter operates, and specific contents of the selection configuration information may be configured according to actual requirements.

The selector extracts an identity identifier of each channel of received multimedia data and determines multimedia data with an identity identifier the same as the data identifier to be the target multimedia data.

The data processing module 102 is configured to perform a format conversion on the target multimedia data to obtain converted data and transmit the converted data to the data transmitting module 105.

The data processing module receives the target multimedia data transmitted by the selector and performs the format conversion on the received target multimedia data to obtain the converted data. Details are as follows.

The data processing module determines a target data format based on preset format configuration information; and performs the format conversion on the target multimedia data based on the target data format, to obtain the converted data in the target data format.

The format configuration information may be pre-configured before the data processing module operates. The format configuration information includes information of data format to be converted. The data format may be modified according to actual requirements.

In an embodiment, the target data format includes, but is not limited to, an LVDS data format, a TTL data format, an MIPI data format, and an EDP data format.

After the target data format is determined, the format conversion is performed on the target multimedia data, to obtain the converted data. The converted data format is the same as the target data format.

The data synthesis module 103 is configured to synthesize the received multimedia data to obtain synthesized data and transmit the synthesized data to the data transmitting module 105.

Figure 2:
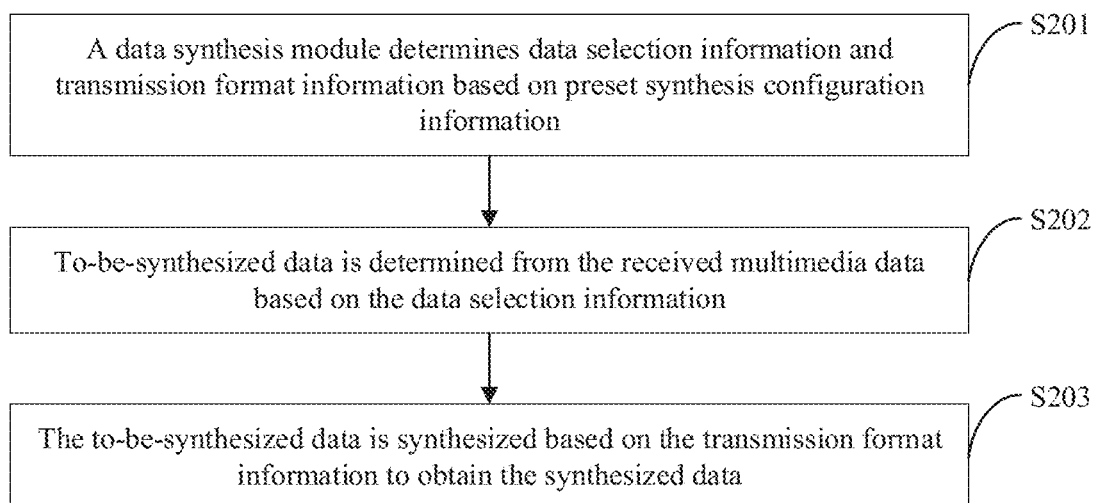
FIG. 2 is a flow chart showing a process of a data synthesis module synthesizing received multimedia data to obtain synthesized data according to an embodiment of the present disclosure.

Reference is made to FIG. 2, which is a flow chart showing a process of a data synthesis module synthesizing received multimedia data to obtain synthesized data according to an embodiment of the present disclosure. Details include the following steps S201 to S203.

In step S201, the data synthesis module determines data selection information and transmission format information, based on preset synthesis configuration information.

The synthesis configuration information is preset in the data synthesis module and may be configured before the data synthesis module operates. Content of the synthesis configuration information may be set according to actual requirements.

The data selection information is used for the data synthesis module to select multimedia data, which includes an identity identifier of multimedia data to be selected.

The transmission format information includes information of a format of data that may be received by a receiver when the data synthesis module outputs the synthesized data to the receiver.

In step S202, to-be-synthesized data is determined from the received multimedia data based on the data selection information.

In an embodiment, the data synthesis module may determine the to-be-synthesized data from the received multimedia data based on data selection information. The to-be-synthesized data may be one channel of multimedia data or multiple channels of multimedia data. The number of the channel of the to-be-synthesized data is less than or equal to the number of the channel of the multimedia data received by the data synthesis module.

In step S203, the to-be-synthesized data is synthesized based on the transmission format information to obtain the synthesized data.

In an embodiment, a data format of the synthesized data is the same as a data format represented by the transmission format information.

The data synthesized by the data synthesis module is in the MIPI data format or an ADP data format.

The data transmitting module 105 is configured to transmit the converted data to a preset first processing device and transmit the synthesized data to a preset second processing device.

It should be noted that the data transmitting module is provided with multiple transmitters. As shown in FIG. 1, five transmitters are provided according to the present disclosure, namely a transmitter 1, a transmitter 2, a transmitter 3, a transmitter 4, and a transmitter 5. Furthermore, the number of the transmitters in the data transmitting module is only an example, and the number of the transmitters in the data transmitting module in the present disclosure is not limited to five.

The transmitter is configured to transmit data. The respective transmitters transmit data in different data formats. In an embodiment, the data transmitting module is provided with five transmitters, and all the transmitters transmit data in different data formats. For example, a transmitter is configured to transmit data in the LVDS data format, a transmitter is configured to transmit data in the TTL data format, a transmitter is configured to transmit data in the EDP data format, a transmitter is configured to transmit data in the MIPI data format, and a transmitter is configured to transmit data in the ADP data format.

Furthermore, the first processing device may receive data in the LVDS data format, the TTL data format, the EDP data format, and the MIPI data format. The second processing device may receive data in the MIPI data format and the ADP data format.

The format configuration information in the data processing module may be set based on the data format of the data received by the first processing device, and the synthesis configuration information in the data synthesis module may be set based on the data format of the data received by the second processing device.

In an embodiment, the first processing device may be a device for displaying multimedia data, and the second processing device may be another multimedia data transmission apparatus according to the present disclosure.

For transmitting the converted data to the first processing device, the data transmitting module may determine a transmitter corresponding to the target data format based on the target data format of the converted data and transmit the converted data to the first processing device by using the determined transmitter. For transmitting the synthesized data to the second processing device, the data transmitting module may determine a transmitter corresponding to the data format of the synthesized data among preset transmitters based on the data format of the synthesized data and transmit the synthesized data to the second processing device by using the determined transmitter. For example, in the case of the converted data in the LVDS data format, the transmitter for transmitting the data in the LVDS data format is called to transmit the converted data. In the case of the synthesized data in the ADP data format, the transmitter for transmitting the data in the ADP data format is called to transmit the synthesized data.

Furthermore, when the data transmitting module is provided with only one transmitter for transmitting the data in the MIPI data format, the transmitter for transmitting the data in the MIPI data format cannot be simultaneously used by the data processing module and the data synthesis module in order to ensure the stability and correctness of data transmission. In an embodiment, when the data processing module is configured to obtain the converted data in the MIPI data format, the data synthesis module is configured to obtain the synthesized data in the ADP data format. When the data synthesis module is configured to obtain the converted data in the MIPI data format, the data processing module is configured to obtain the synthesized data in any one of the LVDS data format, the TTL data format, and the EDP data format.

In the apparatus according to the embodiment of the present disclosure, the data receiver is configured to receive at least one channel of multimedia data and transmit the received multimedia data to the selector and the data synthesis module. The selector is configured to select the target multimedia data from the received multimedia data and transmit the target multimedia data to the data processing module. The data processing module is configured to perform a format conversion on the target multimedia data to obtain the converted data and transmit the converted data to the data transmitting module. The data synthesis module is configured to synthesize the received multimedia data to obtain the synthesized data and transmit the synthesized data to the data transmitting module. The data transmitting module is configured to transmit the converted data to the preset first processing device and transmit the synthesized data to the preset second processing device. In the apparatus according to the present disclosure, multi-channel multimedia data may be synthesized into one channel of multimedia data for transmission, effectively reducing the use of lines during the data transmission process and effectively reducing the cost of data transmission.

The apparatus according to the embodiment of the present disclosure may select multimedia data and transmit the multimedia data to a corresponding processing device according to requirements during the data synthesis and transmission processes, so that the processing device may display the multimedia data. Therefore, the apparatus according to the embodiment of the present disclosure may transmit specific multimedia data to the corresponding device for display during the multi-channel multimedia data transmission process. The apparatus according to the present disclosure can not only synthesize the multi-channel multimedia data and transmit the synthesized data, but also extract specific multimedia data and transmit the specific multimedia data to the corresponding device. The apparatus according to the present disclosure integrates a function of synthesizing multi-channel data into one channel of data for transmission and selecting specific data from the multi-channel data and transmitting the specific data to the corresponding device. The transmission of data synthesized by the multi-channels data and the transmission of specific data to the display device are not affected each other. Thus, the apparatus may be applied in various scenarios, effectively avoiding the use of a large number of lines for transmitting the multimedia data from the data source to the corresponding device, so as to effectively reduce the cost in the data display process.

Reference is made to FIG. 3, which is a schematic diagram of a scenario of a multimedia data transmission apparatus according to an embodiment of the present disclosure. Details are as follows. A multimedia data transmission apparatus 1 receives multimedia data from data sources 1 to 4. The multimedia data transmission apparatus 1 may select multimedia data by using a preset selector, then process the selected multimedia data by using a data processing module, and then transmit the processed data to a display terminal 1. The display terminal 1 may display the received data. A multimedia data transmission apparatus 2 receives data transmitted by the multimedia data transmission apparatus 1; and multimedia data from data sources 5 to 7. In an embodiment, the data transmitted from the multimedia data transmission apparatus 1 to the multimedia data transmission apparatus 2 may be the multimedia data transmitted by the data sources 1 to 4. Alternatively, the data transmitted from the multimedia data transmission apparatus 1 to the multimedia data transmission apparatus 2 may be a part of the multimedia data transmitted by the data sources 1 to 4. Therefore, the multimedia data transmission apparatus 2 receives the multimedia data transmitted by the multimedia data transmission apparatus 1 and the multimedia data from the data sources 5 to 7. When transmitting data to a display terminal 2, the multimedia data transmission apparatus 2 may select data from the received multimedia data, perform a format conversion on the selected data, and then transmit the converted data to the display terminal 2. The display terminal 2 displays the received data. In an embodiment, the multimedia data transmission apparatus 2 may select a part of the received multimedia data and transmit the part of the received multimedia data to a multimedia data transmission apparatus 3. Alternatively, the multimedia data transmission apparatus 2 transmits all the received multimedia data to the multimedia data transmission apparatus 3. Furthermore, the multimedia data transmission apparatus 3 not only receives the multimedia data transmitted by the multimedia data transmission apparatus 2, but also receives multimedia data from data sources 8 to 10. The multimedia data transmission apparatus 3 may select multimedia data from the received multimedia data and transmit the selected multimedia data to the display terminal 3 for display. The multimedia data transmission apparatus 3 may transmit synthesized multimedia data to a processing terminal.

From the above contents, it can be seen that the multimedia data transmission apparatus according to the present disclosure can synthesize multi-channel multimedia data in practical applications, and multiple multimedia data transmission apparatuses can be used to synthesize and transmit multimedia data from data sources located at different locations, without using lines to connect data sources at different locations for transmitting the multimedia data, thereby effectively reducing the use of the lines and reducing the cost of data transmission.

Figure 4:
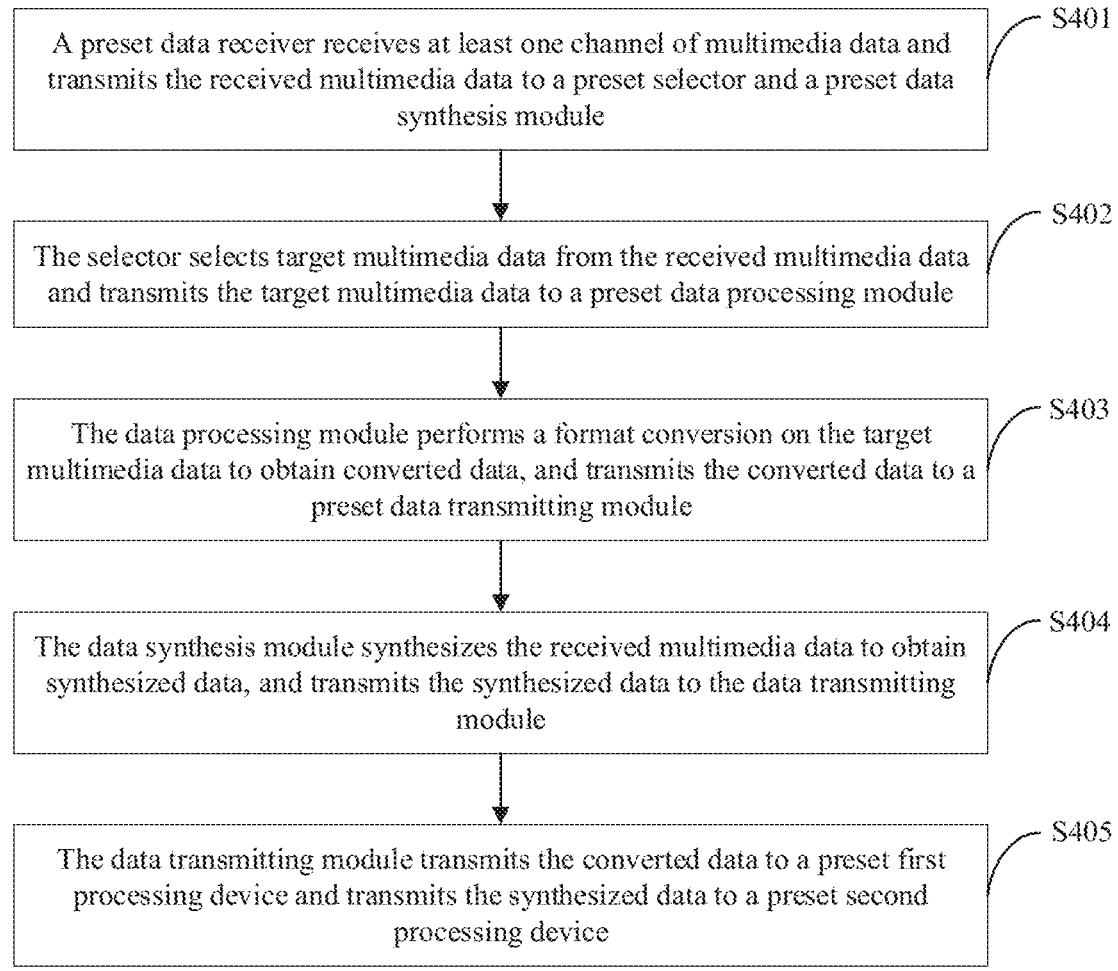
FIG. 4 is a flow chart of a multimedia data transmission method according to an embodiment of the present disclosure.

Reference is made to FIG. 4, which is a flow chart of a multimedia data transmission method according to an embodiment of the present disclosure. The multimedia data transmission method includes the following steps S401 to S405.

In S401, a preset data receiver receives at least one channel of multimedia data and transmits the received multimedia data to a preset selector and a preset data synthesis module.

In S402, the selector selects target multimedia data from the received multimedia data and transmits the target multimedia data to a preset data processing module.

The selector determines a data identifier from preset selection configuration information and determines multimedia data corresponding to the data identifier as the target multimedia data.

In S403, the data processing module performs a format conversion on the target multimedia data to obtain converted data and transmits the converted data to a preset data transmitting module.

The data processing module determines a target data format based on preset format configuration information and performs the format conversion on the target multimedia data based on the target data format, to obtain the converted data in the target data format.

In S404, the data synthesis module synthesizes the received multimedia data to obtain synthesized data and transmits the synthesized data to the data transmitting module.

The data synthesis module determines data selection information and transmission format information based on preset synthesis configuration information, determines to-be-synthesized data from the received multimedia data based on the data selection information, and synthesizes the to-be-synthesized data based on the transmission format information to obtain the synthesized data.

In S405, the data transmitting module transmits the converted data to a preset first processing device and transmits the synthesized data to a preset second processing device.

The data transmitting module determines a transmitter corresponding to the target data format based on the target data format of the converted data and transmits the converted data to the first processing device by using the transmitter.

In the method according to the embodiment of the present disclosure, the data receiver receives at least one channel of multimedia data and transmits the received multimedia data to the selector and the data synthesis module. The selector selects the target multimedia data from the received multimedia data and transmits the target multimedia data to the data processing module. The data processing module performs the format conversion on the target multimedia data to obtain the converted data and transmits the converted data to the data transmitting module. The data synthesis module synthesizes the received multimedia data to obtain the synthesized data and transmits the synthesized data to the data transmitting module. The data transmitting module transmits the converted data to the preset first processing device and transmits the synthesized data to the preset second processing device. According to the present disclosure, multi-channel multimedia data may be synthesized by using the data synthesis module to obtain the synthesized data, and data to be transmitted to the first processing device is selected from the multi-channel multimedia data by using the selector. Thus, in the case of the transmission of multi-channel data, the transmission of specific data to other devices may not be affected. According to the present disclosure, multi-channel data may be transmitted, and specific data also be extracted to be transmitted to other devices without increasing the cost of lines. In this way, multiple data transmission manners can be provided, while the cost of data transmission is reduced.

The implementations of each of the above embodiments and derivatives thereof are all within the scope of protection of the present disclosure.

The embodiments in the description are described in a progressive manner, the same and similar parts between the embodiments may be referred to each other, and each of the embodiment focuses on the differences from other embodiments. In particular, since the system or the embodiments of the system is similar to the embodiments of the method, the system or the embodiments of the system is simply described and may refer to the relevant part of the embodiments of the method. The foregoing system and the embodiments of the system are only schematic. A unit described as a discrete component may or may not be physically separated. Components shown as units may or may not be physical units, that is, the components may be located in one place or may be distributed onto multiple network units. Some or all modules thereof may be selected based on an actual requirement, to implement an objective of the solution in the embodiments. Those skilled in the art may understand and implement the present disclosure without any creative effort.

Those skilled in the art should further be noted that, units and algorithm steps described in the embodiments disclosed herein may be implemented by electronic hardware, computer software or a combination thereof. In order to clearly illustrate interchangeability of the hardware and the software, components and steps in the embodiments are described generally in terms of functions in the above description. Whether these functions are performed in hardware or software depends on the specific application and design constraints for the technical solution. Those skilled in the art may implement the described functions by using different methods for each specific application, and such implementation should not be considered to go beyond the scope of the present disclosure.

According to the above description of the disclosed embodiments, those skilled in the art can implement or practice the present disclosure. Many modifications to these embodiments are apparent for those skilled in the art. The general principles defined herein may be applied to other embodiments without departing from the spirit or scope of the present disclosure. Therefore, the present disclosure should not be limited to the embodiments disclosed herein, but has the widest scope in accordance to the principle and the novel features disclosed herein.

The invention claimed is:

1. A multimedia data transmission apparatus, comprising a selector, a data processing module, a data synthesis module, a data receiver, and a data transmitting module, wherein
the selector is connected to the data receiver and the data processing module, and the data processing module is connected to the data transmitting module; the data synthesis module is connected to the data receiver and the data transmitting module;
the data receiver is configured to receive at least one channel of multimedia data and transmit the received multimedia data to the selector and the data synthesis module;
the selector is configured to select one channel of the at least one channel of multimedia data as target multimedia data and transmit the target multimedia data to the data processing module;
the data processing module is configured to perform a format conversion on the target multimedia data to obtain converted data, and transmit the converted data to the data transmitting module;
the data synthesis module is configured to determine data selection information and transmission format information based on preset synthesis configuration information; determine one or more channels of the at least one channel of multimedia data as to-be-synthesized data based on the data selection information; and synthesize the to-be-synthesized data based on the transmission format information to obtain synthesized data, and transmit the synthesized data to the data transmitting module; and
the data transmitting module is configured to transmit the converted data to a preset first processing device and transmit the synthesized data to a preset second processing device.

2. The apparatus according to claim 1, wherein the selector is further configured to:
obtain a data identifier from preset selection configuration information and determine the one channel of the at least one channel of multimedia data corresponding to the data identifier as the target multimedia data.

3. The apparatus according to claim 1, wherein the data processing module is further configure to:
determine a target data format based on preset format configuration information; and
perform the format conversion on the target multimedia data based on the target data format, to obtain the converted data in the target data format.

4. The apparatus according to claim 1, wherein the data transmitting module comprises a plurality of transmitters, wherein each of the plurality of transmitters is configured to transmit data, and the plurality of transmitters transmit data in different data formats.

5. A multimedia data transmission method, comprising:
receiving, by a preset data receiver, at least one channel of multimedia data, and transmitting the received multimedia data to a preset selector and a preset data synthesis module;
selecting, by the selector, one channel of the at least one channel of multimedia data as target multimedia data and transmitting the target multimedia data to a preset data processing module;
performing, by the data processing module, a format conversion on the target multimedia data to obtain converted data, and transmitting the converted data to a preset data transmitting module;
determining, by the data synthesis module, data selection information and transmission format information based on preset synthesis configuration information;
determining, by the data synthesis module, one or more channels of the at least one channel of multimedia data as to-be-synthesized data based on the data selection information; and
synthesizing, by the data synthesis module, the to-be-synthesized data based on the transmission format information to obtain synthesized data, and transmitting the synthesized data to the data transmitting module; and
transmitting, by the data transmitting module, the converted data to a preset first processing device and transmitting the synthesized data to a preset second processing device,
wherein the selector is connected to the data receiver and the data processing module, and the data processing module is connected to the data transmitting module; and the data synthesis module is connected to the data receiver and the data transmitting module.

6. The method according to claim 5, wherein the selecting, by the selector, the one channel of the at least one channel of multimedia data as target multimedia data comprises:
determining, by the selector, a data identifier from preset selection configuration information, and determining the one channel of the at least one channel of multimedia data corresponding to the data identifier as the target multimedia data.

7. The method according to claim 5, wherein the performing, by the data processing module, the format conversion on the target multimedia data to obtain the converted data comprises:
determining, by the data processing module, a target data format based on preset format configuration information; and
performing the format conversion on the target multimedia data based on the target data format, to obtain the converted data in the target data format.

8. The method according to claim 7, wherein the transmitting, by the data transmitting module, the converted data to the preset first processing device comprises:
determining, by the data transmitting module, a transmitter corresponding to the target data format based on the target data format of the converted data and transmitting the converted data to the first processing device by using the transmitter.

* * * * *